United States Patent [19]

Holmes et al.

[11] Patent Number: 5,463,523
[45] Date of Patent: Oct. 31, 1995

[54] ZERO FIELD DEGAUSSING SYSTEM AND METHOD

[75] Inventors: John J. Holmes, Jessup; Milton H. Lackey, Laurel, both of Md.

[73] Assignee: The United States of America as represented by the Secretary of the Navy, Washington, D.C.

[21] Appl. No.: 115,075

[22] Filed: Sep. 1, 1993

[51] Int. Cl.⁶ ............................. B63G 9/06; H01F 13/00
[52] U.S. Cl. ........................................ 361/149; 114/240 R
[58] Field of Search ........................... 361/143, 146, 361/149, 267; 114/240 R, 270; 102/402; 307/101

[56] References Cited

U.S. PATENT DOCUMENTS

| | | | |
|---|---|---|---|
| 2,412,617 | 12/1946 | Jenkins | 361/146 X |
| 2,421,583 | 6/1947 | Stuart, Jr. | 114/240 R |
| 2,519,395 | 8/1950 | Perlow et al. | 114/240 R |
| 2,718,205 | 9/1955 | Gebs et al. | 114/240 R |
| 2,730,063 | 1/1956 | Gebs et al. | 114/240 R |
| 2,793,602 | 5/1957 | Haglund | 114/240 R |
| 2,832,041 | 4/1958 | Trachtenberg | 114/240 R |
| 2,853,040 | 9/1958 | Grillo | 114/240 R |
| 2,891,502 | 6/1959 | Cochran, Jr. et al. | 114/240 R |
| 2,933,059 | 4/1960 | Cohen et al. | 114/240 R |
| 3,110,282 | 11/1963 | Foerster | 361/149 X |
| 3,215,904 | 11/1965 | Burt | 361/149 |
| 4,373,174 | 2/1983 | Akesson | 361/149 |
| 4,676,168 | 6/1987 | Cotton | 102/402 |
| 4,734,816 | 3/1988 | Guillemin et al. | 361/149 |
| 4,812,759 | 3/1989 | Duthoit | 361/149 X |
| 5,032,792 | 7/1991 | Wing et al. | 361/149 X |
| 5,189,590 | 2/1993 | Schneider | 361/149 |

*Primary Examiner*—A. D. Pellinen
*Assistant Examiner*—Fritz M. Fleming
*Attorney, Agent, or Firm*—Jacob Shuster

[57] ABSTRACT

A system and method are provided for degaussing a vessel moving over an underwater magnetic detector. A location at the vessel residing over the magnetic detector is continuously provided to a controller. The vessel is equipped with a plurality of degaussing coils such that each is independently controllable. Degaussing coil currents are determined by the controller according to a least squares minimization routine such that an off-board magnetic field of the vessel at the location over the magnetic detector is absolute zero. In addition, the determined coil currents minimize the off-board magnetic field of the vessel at all other locations. The determined coil currents are then applied to the appropriate degaussing coils via separate power supplies.

9 Claims, 3 Drawing Sheets

ZERO FIELD DEGAUSSING SYSTEM AND METHOD

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to degaussing of a vessel, and more particularly to a system and method for zeroing the off-board magnetic field of a vessel at specific locations on the vessel within detection range of mines or mine-like contacts.

BACKGROUND OF THE INVENTION

Existing magnetic silencing systems reduce the vulnerability of naval vessels to magnetically actuated mines and detection systems. This is accomplished through the minimization of a vessel's magnetic signature with degaussing coils or other means of generating magnetic fields. Degaussing coils are loops of wire which, when energized with the proper amount of direct electrical current, produce magnetic fields whose shape is the same as the vessel's uncompensated signature but of opposite polarity. The degaussing coils therefore cancel the undegaussed fields of the vessel.

Prior art degaussing system designs attempt to minimize the static magnetic field signature of the vessel around and along its entire length. For economic and other practical reasons, the degaussing system can not make the vessel's signature exactly zero everywhere. Therefore, a compromise is achieved by setting the current in the degaussing loops to produce the smallest signature over the largest possible area around the vessel.

A schematic diagram of a prior art degaussing system for a vessel is shown in FIG. 1 divided into three sub-systems with coils that respectively control the ship's magnetization in three orthogonal directions, ie., longitudinal sub-system 10L, vertical sub-system 10M, and athwartship sub-system 10A. Each sub-system is powered by a respective power supply 12L, 12M and 12A receiving control signals from an analog degaussing controller 14.

Degaussing controller 14 sends analog control signals to power supplies 12L, 12M and 12A. The input signals to controller 14 are the vessel's heading and a coarse indication of the geomagnetic latitude, or the earth's magnetic field measured in the vessel's three orthogonal directions with a mast mounted sensor 13. These input signals compensate the "induced" magnetization which changes with vessel motion. The permanent component of magnetization is compensated with three constant current settings whose values are determined during calibration of the degaussing system. All the degaussing loops in a sub-system (i.e., aligned in a specific direction) are connected in series. For example, the current that leaves power supply 12L enters loop $10L_1$, leaves loop $10L_1$ and enters loop $10L_2$, etc. The magnetic field generated by each loop is controlled by manually changing the number of conductors active in each loop. The manual adjustment of the degaussing loops and the current settings of the permanent component of magnetization are known as coil calibration.

All degaussing systems require adjustments or calibration of their operating parameters to achieve small magnetic field signatures. Calibration of the degaussing system is performed at a fleet facility called a degaussing range. At the range, the vessel sails back and forth over the top of underwater magnetic field sensors from which calibration data is obtained. Each degaussing loop is energized, one at a time, and the resultant signature measured. Then the signature of the vessel is measured with the degaussing system off. The power supply current and active turns for each loop is adjusted until both the induced and permanent components of the signature are minimized. The system is not readjusted until the vessel returns to a degaussing range. The disadvantages of existing degaussing coil systems include:

1) manual adjustment of each loop, i.e., no real-time control, 2) imprecise adjustment of each loop since turns in each loop are either wholly activated or deactivated, and 3) a compromise must be accepted in the degree of signature reduction due to the requirement that the field must be minimized over a large volume of space surrounding the vessel.

SUMMARY OF THE INVENTION

Accordingly, it is an object of the present invention to provide a system and method for improving the operation of a vessel's degaussing system to reduce the vulnerability of the vessel to magnetically actuated mines and detection systems.

Another object of the present invention is to provide a system and method for precise and real-time adjustment of a vessel's degaussing system.

Other objects and advantages of the present invention will become more obvious hereinafter in the specification and drawings.

In accordance with the present invention, a system and method are provided for degaussing a vessel moving over an underwater magnetic detector. Data on one specific location of the vessel residing over the magnetic detector is continuously provided to a controller. The vessel is equipped with a plurality of degaussing coils such that each of the plurality is independently controllable. Coil currents are determined by the controller according to a least squares minimization routine with linear constraints such that the magnetic field in the vicinity of the specific location of the vessel over the magnetic detector is zero. In addition, the coil currents determined for the degaussing coils will minimize the off-board magnetic field of the vessel at all other locations not directly over the magnetic detector. The determined coil currents are then applied to the appropriate degaussing coils.

DETAILED DESCRIPTION OF THE INVENTION

Figure 1:
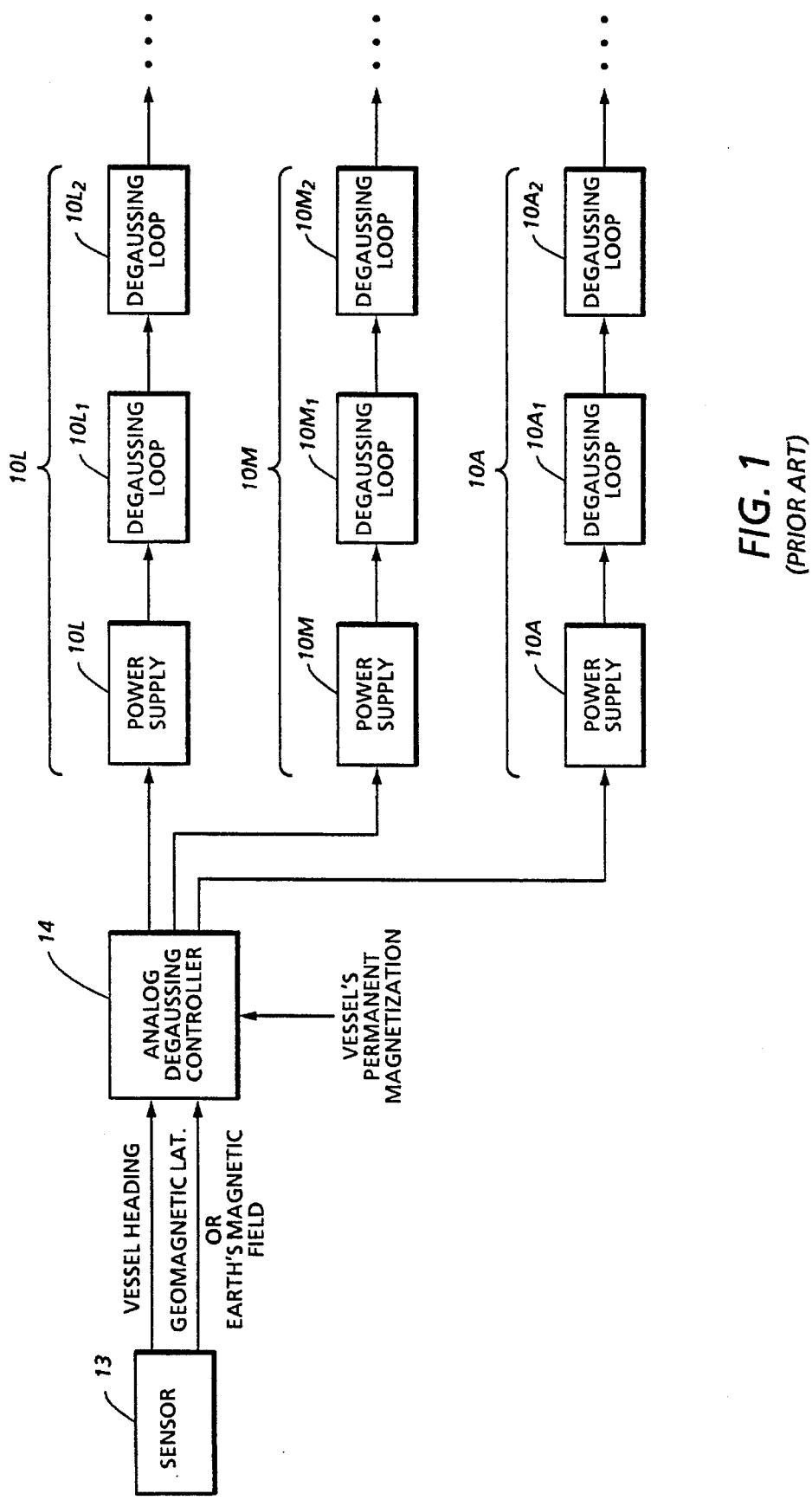
FIG. 1 is a schematic diagram of a prior art degaussing system.
Figure 2A:
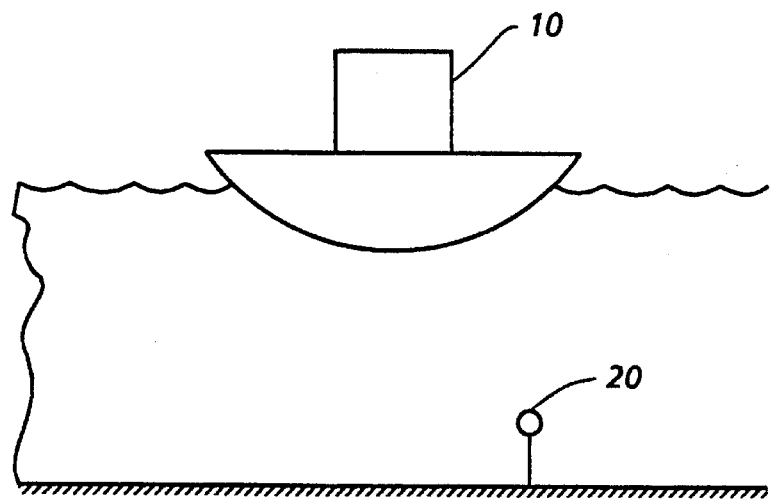
FIGS. 2A and B depict a scenario of a vessel passing over a magnetic detector.
Figure 2B:
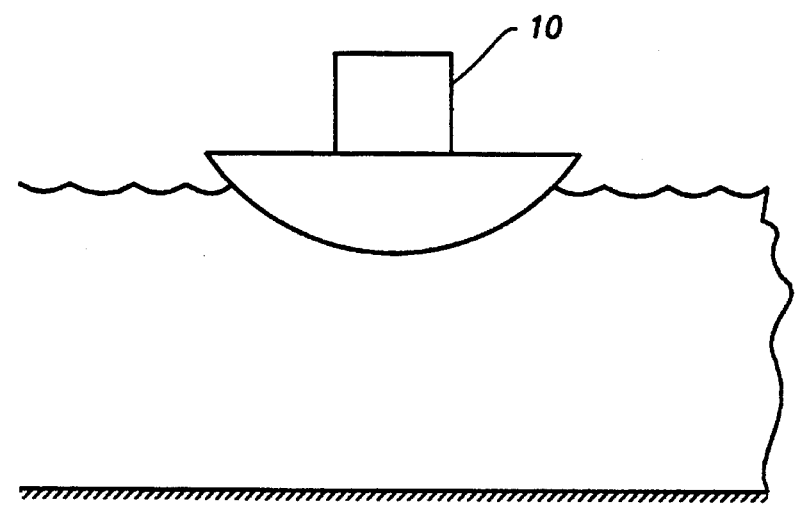

Referring again to the drawings, and more particularly to FIGS. 2A and 2B, the scenario of a marine vessel 10 moving over a magnetic detector 20 will be used to explain the solution provided by the present invention. Vessel 10 may comprise a surface vessel as shown, or a submarine, or even a ground surface vehicle. Magnetic detector 20 may be part of a mine or merely part of a magnetic detection system. In either case, the goal of the present invention is to zero the off-board magnetic field due to vessel 10 at a specific location shown in FIG. 2A over magnetic detector 20 as compared to a calibration degaussing range herein before described with respect to FIG. 1. Also the off-board magnetic field due to vessel 10 at all other locations as shown in FIG. 2B is minimized if it is a surface ship or ground surface vehicle (or at all other locations of the three dimensional volume around vessel 10 if it is a submarine). Thus, as vessel 10 moves over magnetic detector 20, the present invention moves the "zero point" of the off-board magnetic field in correspondence with the location of magnetic detector 20 as shown in FIG. 2A.

Figure 3:
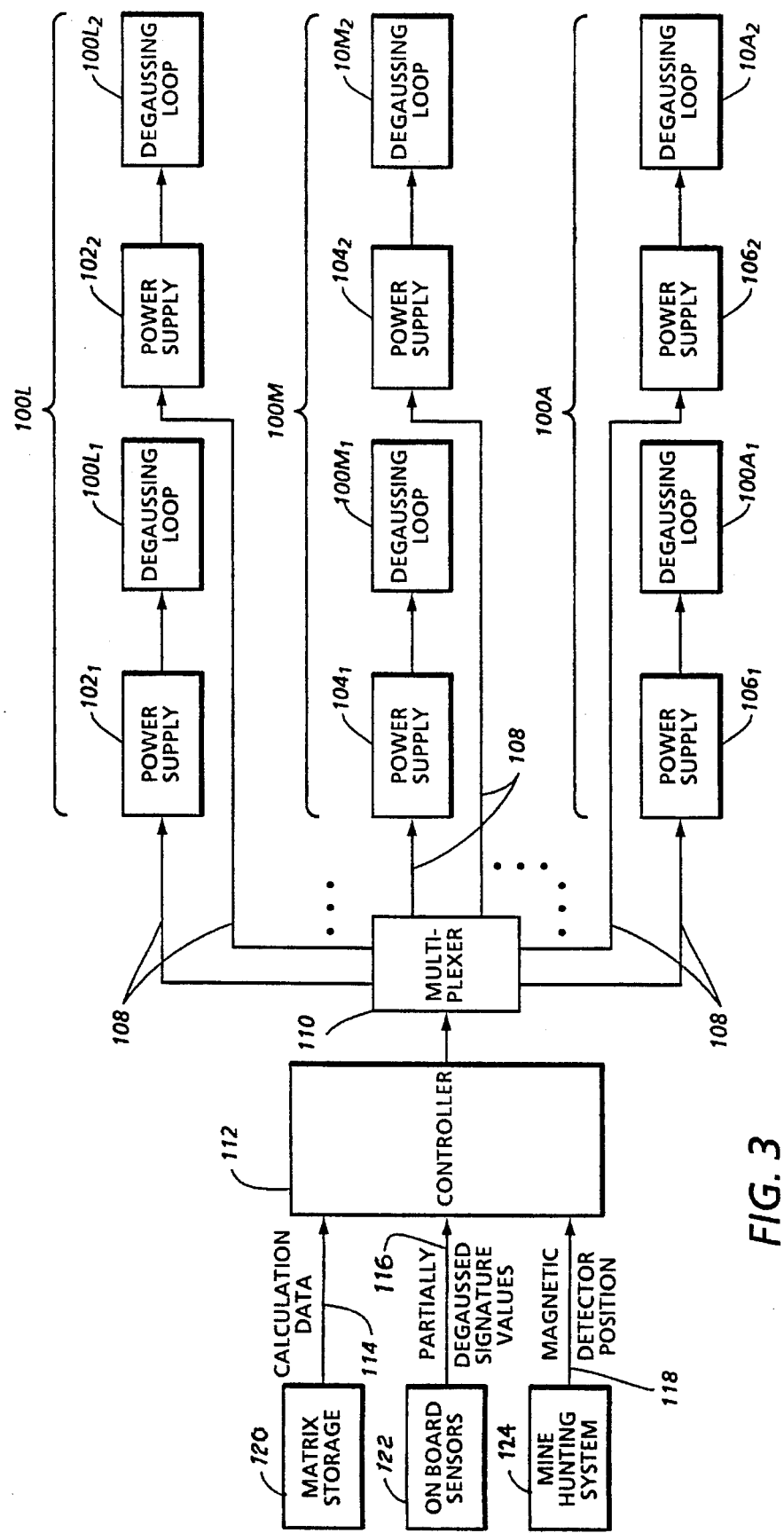
FIG. 3 is a schematic of a zero field degaussing system according to the present invention.

A schematic of the zero field degaussing system according to the present invention is shown FIG. 3 and referenced generally by the numeral 100. As in existing degaussing systems depicted in FIG. 1, system 100 includes a plurality of degaussing coil sub-systems 100L, 100M and 100A respectively arranged in each of the longitudinal, vertical and athwartship orientations as is well known in the art. The longitudinal degaussing loops are successively referenced $100L_1$, $100L_2$, . . . ; the vertical degaussing loops are successively referenced $100M_1$, $100M_2$, . . . ; and the athwartship degaussing loops are successively referenced $100A_1$, $100A_2$, . . . . In contrast to the prior art, each degaussing loop is independently powered by a separate corresponding power supply, i.e., longitudinal loops are powered by corresponding power supplies $102_1$, $102_2$, . . . ; vertical loops are powered by corresponding power supplies $104_1$, $104_2$, . . . ; and athwartship loops are powered by corresponding power supplies $106_1$, $106_2$, . . . . Since each loop is current driven, each power supply is typically a current source.

The power supplies are respectively controlled by independent control signals that may be passed over an array dedicated control signal lines 108 from a multiplexer 110 as shown in FIG. 3. Alternatively, the same array of independent control signals may be transmitted on an addressable data bus (not shown) to the corresponding power supplies. In either case, the independent control signals produce an output from a controller 112, e.g., a digital processor.

Controller 112 determines its output from the independent control signals in order to: 1) zero the off-board magnetic field due to the vessel at the specific location above the magnetic detector 20 as shown in FIG. 2A, and 2) minimize the off-board magnetic field due to the vessel at all other locations below and/or around the vessel/vehicle. To do this, controller 112 must receive two types of input data—calibration data through line 114 and operational (real-time) data through lines 116 and 119 as denoted in FIG. 3. The calibration data consists of off-board degaussing coil-effect data and undegaussed data. The operational data consists of: 1) "partially" degaussed signature values below the vessel in a horizontal plane, and 2) position of the magnetic detector relative to the vessel. Both of these data sets are explained further below.

Calibration Data

Coil-effect data is defined during the vessel calibration phase by recording off-board magnetic signature changes per unit change of degaussing coil current (I) as is well known and performed in the prior art. Typically, one set of coil-effect measurements of coefficient matrix elements (c) are made for each degaussing loop and stored in a coefficient matrix storage 120 as a function of loop position on the vessel. The matrices are used to set up a system of linear equations that will be described further below.

The undegaussed data are also defined during the vessel calibration phase by measuring off-board magnetic signatures. These signatures correspond to induced and permanent magnetic states of the vessel for the longitudinal, vertical and athwartship orthogonal directions. Induced magnetic states are those brought on by change in the vessel's geographic position while permanent magnetic states are those brought on by mechanically stressing the physical steel structure of the vessel.

Operational Data

The "partially" degaussed signature below the vessel is based on predictions of the signatures using real-time measurements from on-board magnetic sensors 122. The data itself is in the form of a map of magnetic field values over a horizontal plane below the vessel. Such a map of the predicted off-board partially degaussed signatures may be determined by a closed-loop degaussing control system described in U.S. Pat. No. 5,189,590, which is hereby incorporated by reference.

Position data in terms of coordinates x,y,z and heading $\theta$ conveying the magnetic detector's location relative to the graphical position of the vessel is typically obtained from sophisticated mine hunting system 124 well known in the art. The position of the magnetic detector is thereby converted into vessel coordinates to define that portion of the partially degaussed signature to be adjusted to absolute zero.

The linear equations processed by controller 112 are based on a linear least squares minimization routine specially constrained by the data in lines 114, 116 and 118. The set of linear equations accordingly programs processing of data from the off-board coefficient matrix storage 120 and the predicted partially degaussed off-board signature from sensors 122 and data from system 124 as follows:

$F_1(x_1,y_1,z_1,\theta) = I_1*C_{11}(x_1,y_1,z_1) +$ $\qquad \ldots I_j*C_{1j}(x_1,y_1,z_1) + \ldots I_n*C_{1n}(x_1,y_1,z_1)$

. . .

$F_i(x_i,y_i,z_i,\theta) = I_1*C_{i1}(x_i,y_i,z_i) +$ $\qquad \ldots I_j*C_{ij}(x_i,y_i,z_i) + \ldots I_n*C_{in}(x_i,y_i,z_i)$

. . .

$F_m(x_m,y_m,z_m,\theta) = I_1*C_{m1}(x_m,y_m,z_m) +$ $\qquad \ldots I_j*C_{mj}(x_m,y_m,z_m) + \ldots I_n*C_{mn}(x_m,y_m,z_m)$ where $F_i$ represents the off-board magnetic field at the i-th degaussing position on a planar surface under, or other surface around, the vessel based on the i-th degaussing position coordinates $(x_i,y_i,z_i)$ and the vessel's heading $\theta$, $I_j$ represents coil current change (I) for the j-th degaussing coil, $C_{ij}$ represents the coefficient matrix element corresponding to the i-th degaussing position around the vessel and the j-th degaussing loop, based on the i-th degaussing position coordinates $(x_i,y_i,z_i)$, m represents the total number of degaussing positions, and n represents the total number of degaussing coils in all directions where m>n.

Since m>n, the linear equations represent an overdetermined system that can be solved by application of the least squares minimization procedure which is per se well known in the art. More specifically, let $H_i$ represent the partially degaussed off-board signature, and $(x_k,y_k,z_k)$ represent the k-th degaussing position in the vicinity of the magnetic detector where the off-board field is to be set to absolute zero. The above set of linear equations are then solved for the degaussing current changes I such that $$\sqrt{(\Sigma(H_i - F_i)^2)}$$

is minimized while maintaining the absolute equality constraint $$H(x_k,y_k,z_k) = -F(x_k,y_k,z_k)$$

Thus, as the vessel moves over the magnetic detector 20 as diagrammed in FIG. 2A, the coefficient matrix $C_{ij}$ adjusts to compensate for vessel movement. By way of example, controller 112 may be programmed in accordance with the FORTRAN code listing attached hereto as an Appendix.

The advantages of the present invention are numerous. A method and means are provided to force the off-board magnetic field signature of a vessel to exactly zero at specific locations about the vessel while minimizing the off-board signature of the vessel everywhere else under and/or around it. Independently controlled degaussing loops are provided with an exact current level for their particular position on the vessel. This provides a high degree of precision needed to zero the magnetic signature of the vessel at a specified location, i.e., over the magnetic detector. Further, the present invention provides real-time, automatic adjustment of the degaussing coil currents.

Although the invention has been described relative to a specific embodiment thereof, there are numerous variations and modifications that will be readily apparent to those skilled in the art in the light of the above teachings. For example, the approach of the present invention might also be applied to electric and electromagnetic field signature compensation, and also potentially to acoustic signatures. Further, the calibration data may be expanded to include mathematical data derived from virtual multipole magnets used to represent individual machinery items or the harmonic expansion of the vessel's magnetization. Mathematical data would then be included in the coefficient matrix $C_{ij}$. It is therefore to be understood that, within the scope of the appended claims, the invention may be practiced other than as specifically described.

What is claimed as new and desired to be secured by Letters Patent of the United States is:

APPENDIX
FORTRAN Code Listing

```
c
c   subroutine LSQ_DG_w_Nq_and_Eq_Constraints -+-+-+-+-+-+-+-+-+-+-+-+-+-+-+-
c
      subroutine LSQ_DG_w_Nq_and_Eq_Constraints
c
c   Routine to Cycle the DG System to Minimize the Signature plus
c   Zero the Signature at Pre-Defined Locations
c
c
c
c      A [ ma x n ] - D/G Coil Coefficient Matrix
c
c      x [ n ]      - D/G Amp Turns Vector
c
c      b [ ma ]     - UND/G Signature
c
c      E [ me x n ] - Equality Constraint Matrix
c
c      f [ me ]     - Equality Constraint Vector
c
c      G [ mg x n ] - Negative Constraint Matrix
c
c      h [ mg ]     - Negative Constraint Vector
c
c
c      n - Number_of_DG_Vectors
c
c      ma - Number_of_Off_Board_Sensors + Number_of_DG_Vectors
c
c      me - Number_of_Zero_Sensors
c
c      mg - (2 * Number_of_DG_Vectors)
c                                           [ E f ]
c      W [ (me + ma + mg) x (n + 1) ] = [ A b ]
c                                           [ G h ]
c
c      WK - [ 2(me + n) + max(ma + mg, n) + (mg + 2)(n + 7) ]
c
c      IWK - [ (mg + 2n + 2) ]
c
c
c
c      Constraints are specified as Ex = f & Gx > h.
c
c
c
c   Normal Bipolar D/G Problem:
c
c      D/G problem involves |x| < h.
c
c      This implies x < h & x > -h.
c
c      Therefore, -x > -h & x > -h satisfies the specifications.
c
c
c   Positive D/G Problem: (Note - Reverse D/G Currents)
c
c      D/G problem involves x < h & x > -e (small).
c
```

```
c      Therefore, -x > -h & x > -e satisfies the specifications.
c
c
c  Negative D/G Problem: (Note - Reverse D/G Currents)
c
c      D/G problem involves x < e (small) & x > -h.
c
c      Therefore, -x > -e & x > -h satisfies the specifications.
c
c
c  Modified for zero signature @ pre-selected points adds
c
c      Ex ~ f.
c
c
c  Modified for general constraints involves adding "n" equations
c  to the coefficient matrix as follows:
c
c      [0 0 0 ... ( sqrt ( 2.0 * alpha ) / ith constraint ) 0 ...] = 0.
c
c include 'pcdg_Par.fin'
       include 'pcdg_Fil.fin'
       include 'pcdg_Sen.fin'
       include 'pcdg_Col.fin'
       include 'pcdg_Mea.fin' character
     +   clb * 4,
     +   str1 * 20,
     +   T_Mode * 4 integer
     +   Get_Sensor_Sequence logical
     +   Constrain_Currents,
     +   Positive_Only,
     +   Negative_Only parameter (
     +   mme = max_Number_of_Off_Board_Sensors,
     +   mma = max_Number_of_Off_Board_Sensors +
     +         max_Number_of_DG_Vectors,
     +   mmg = 2 * max_Number_of_DG_Vectors,
     +   mn  = max_Number_of_DG_Vectors
     +         )

dimension
     +   opt ( 1 ),
     +   W ( mme + mma + mmg, mn + 1 ),
     +   x ( mn ),
     +   wk (
     +   2*(mme + mn) + (mma + mmg) + (mmg + 2)*(mn + 7) ),
     +   iwk (mmg + 2*mn + 2)

Positive_Only = .false.
       Negative_Only = .false.

c
c  Use Absolute Inequality Constraints?
```

```
c
      write ( 6, * )
     +    ' Use Absolute Inequality Constraints (Y)?' ans = ' '
      read ( 5, 01 ) ans mg = 0 if ( upcase ( ans ) .ne. 'N' ) then mg = 2 * Number_of_DG_Vectors c
c   Zero Negative Currents?
c
      write ( 6, * )
     +    ' Zero Negative Currents (N)?' ans = ' '
      read ( 5, 01 ) ans if ( upcase ( ans ) .eq. 'Y' ) then

Positive_Only = .true.

else c
c   Zero Positive Currents?
c
      write ( 6, * )
     +    ' Zero Positive Currents (N)?' ans = ' '
      read ( 5, 01 ) ans if ( upcase ( ans ) .eq. 'Y' ) Negative_Only = .true.

end if end if c
c   What Turn Values to use?
c
      write ( 6, * )
     +    ' Use <A>ctive or <M>ax D/G Coil Turns (A)?'

T_Mode = 'M'
      ans = ' '
      read ( 5, 01 ) ans if ( upcase ( ans ) .ne. 'M' ) T_Mode = 'A' me = Number_of_Zero_Sensors
     +    (
     +    Number_of_Sensors,
```

```
       +     Zero_Sensor_Flag
       +     )

c
c   Zero Signature Data?
c if ( me .ne. 0 ) then write ( 6, * ) ' Zero Signature @ Specified Sensors (N)?'
         read ( 5, 01 ) ans
               if ( upcase ( ans ) .ne. 'Y' ) me = 0 end if c
c   Constrain Current Magnitudes?
c

Floating_Alpha = 1000.

ma = Number_of_Off_Board_Sensors write ( 6, * )
      +    ' Use General D/G Coil Current Magnitude Constraints (N)?' read ( 5, 01 ) ans

Constrain_Currents = .false.

if ( upcase ( ans ) .eq. 'Y' ) then c
c   Get Starting Alpha
c write ( 6, * )
      +       ' Enter the Initial Alpha Constraint (',
      +       Floating_Alpha, ' ):' str1 = ' '
         read ( 5, 01 ) str1
         if ( str1 .ne. ' ' ) then

Floating_Alpha = strval ( str1 )

end if write ( 6, * )
      +       ' Alpha Constraint translated as ',
      +       Floating_Alpha if ( Floating_Alpha .gt. 0.0 ) then Constrain_Currents = .true.
            ma = ma + Number_of_DG_Vectors end if end if c
```

```
c   Reset Constraints to % of Max?
c if ( mg .gt. 0 .or. Constrain_Currents ) then write ( 6, * )
     +      ' Reset D/G Coil Constraints to Scaled Value of ',
     +      'Max Current (N)?' ans = ' '
         read ( 5, 01 ) ans if ( upcase ( ans ) .eq. 'Y' ) then call Reset_DG_Coil_Constraints end if end if n = Number_of_DG_Vectors
      kw = mme + mma + mmg
      opt ( 1 ) = 1.0 c
c   Set up Equality Constraint Portion of W Matrix (E Matrix)
c if ( me .gt. 0 ) then isn = 0 do jsn = 1, Number_of_Off_Board_Sensors if ( Zero_Sensor_Flag ( jsn ) .eq. 'Y' ) then isn = isn + 1 do jcl = 1, n

W ( isn , jcl ) =
     +               Off_Board_DG_Coil_Matrix ( jsn, jcl )

end do

W ( isn , n + 1 ) =
     +            A_UNDG_Off_Board_Fields ( jsn )

end if end do end if c
c   Set up Normal LSQ Portion of W Matrix (A Matrix)
c do isn = 1, Number_of_Off_Board_Sensors ksn = isn + me
```

```
          do jcl = 1, n

W ( ksn , jcl ) =
     +         Off_Board_DG_Coil_Matrix ( isn, jcl )

end do

W ( ksn , n + 1 ) =
     +      A_UNDG_Off_Board_Fields ( isn )

end do c
c   Add general constraint equations
c if ( Constrain_Currents ) then do ieq = 1, Number_of_DG_Vectors if ( ieq .le. Number_of_Meas_DG_Runs ) then call Get_Mas_Coil_Correlation
     +          ( Meas_DG_Coil_Label ( ieq ), kcl, kgp )

else call Get_Calc_Coil_Label ( ieq, clb, kcl, kgp )

call Get_Mas_Coil_Correlation
     +          ( clb, kcl, kgp )

end if

Constraint = DG_Coil_Constraint ( kcl, kgp )

keq = ieq + Number_of_Off_Board_Sensors do jeq = 1, Number_of_DG_Vectors

W ( keq , jeq ) = 0.0
            if ( ieq .eq. jeq .and. Constraint .gt. 0.0 )
     +         W ( keq , jeq ) =
     +           sqrt ( 2.0 * Floating_Alpha ) / Constraint end do W ( keq , n + 1 ) = 0.0 end do end if c
c   Set up Inequality Constraint Portion of W Matrix (G Matrix)
c do icl = 1, n kcl = icl + ma + me
        lcl = kcl + n
```

```
        do jcl = 1, n

W ( kcl , jcl ) = 0.0
          W ( lcl , jcl ) = 0.0 if ( icl .eq. jcl ) then

W ( kcl , jcl ) = -1.0
             W ( lcl , jcl ) = 1.0 end if end do c
c   Get Master Coil indices
c
        if ( icl .le. Number_of_Meas_DG_Runs ) then clb = Meas_DG_Coil_Label ( icl )

else call Get_Calc_Coil_Label ( icl, clb, jcl, jgp )

end if call Get_Mas_Coil_Correlation
     +        ( clb, jcl, jgp )

c
c   get turn data
c
        nmt = 0
        nct = 0
        nat = 0 do isc = 1, Number_of_Coil_Sections ( jcl, jgp )

nmt = nmt +
     +          Max_Number_of_Coil_Turns ( isc, jcl, jgp )
           nct = nct +
     +          Number_of_Cal_Coil_Turns ( isc, jcl, jgp )
           nat = nat +
     +          Number_of_Active_Coil_Turns ( isc, jcl, jgp )

end do c
c   Get D/G Coil Constraint
c
        nt = nmt
        if ( upcase ( T_Mode ) .eq. 'A' ) nt = nat xz = nt / ( AMaster_Cal_Current ( jcl, jgp ) * nct )

aconst = -abs (
     +      DG_Coil_Constraint ( jcl, jgp ) * xz )
```

```
c           aconst1 = aconst + T_DG_Amp_Turns ( icl ) * xz / nt
c           aconst2 = aconst - T_DG_Amp_Turns ( icl ) * xz / nt aconst1 = aconst
            aconst2 = aconst if ( aconst1 .gt. 0.0 .or. Positive_Only )
     +         aconst1 = -0.000000001
            if ( aconst2 .gt. 0.0 .or. Negative_Only )
     +         aconst2 = -0.000000001

W ( kcl , n + 1 ) = aconst1
            W ( lcl , n + 1 ) = aconst2 end do call lsei (
     +   W,
     +   kw,
     +   me,
     +   ma,
     +   mg,
     +   n,
     +   opt,
     +   x,
     +   rnorme,
     +   rnorma,
     +   ier,
     +   wk,
     +   iwk
     +   )

if ( ier .ne. 0 ) then write ( 6, * ) ' LSQ Error = ', ier
            if ( ier .eq. 1 )
     +         write ( 6, * )
     +         ' LSQ Solution Obtained w/ Incomplete Constraints.'
            if ( ier .eq. 2 )
     +         write ( 6, * )
     +         ' NO LSQ Solution Obtained.  Inconsistent Constraints.'
            if ( ier .eq. 4 )
     +         write ( 6, * )
     +         ' LSQ Input Error Detected by LSEI Routine.'
            pause else write ( 6, * ) ' LSQ Constrained Solution Successful...' c
c  calculate NI
c
         do icl = 1, Number_of_DG_Vectors c
c  Get Master Coil indices
c
            if ( icl .le. Number_of_Meas_DG_Runs ) then
```

```
            clb = Meas_DG_Coil_Label ( icl )

else call Get_Calc_Coil_Label ( icl, clb, jcl, jgp )

end if call Get_Mas_Coil_Correlation
     +        ( clb, jcl, jgp )
c
c   get total cal turns
c
         nct = 0 do isc = 1, Number_of_Coil_Sections ( jcl, jgp )

nct = nct +
     +           Number_of_Cal_Coil_Turns ( isc, jcl, jgp )

end do

ALSQ_Factors ( icl ) = x ( icl )
         DG_Amp_Turns ( icl ) = x ( icl ) * nct *
     +        AMaster_Cal_Current ( jcl, jgp )

end do
c
c   Total new DG Currents
c
      do icl = 1, Number_of_DG_Vectors

T_DG_Amp_Turns ( icl ) =
     +        S_DG_Amp_Turns ( icl ) + DG_Amp_Turns ( icl )

end do end if call Calculate_C_DG_Off_Board_Fields
     call Display_DG_Amp_Turns
c
c   Save the Data?
c
     write ( 6, * )
   +    ' Save the D/G Currents (Y)?' ans = ' '
     read ( 5, 01 ) ans if ( upcase ( ans ) .ne. 'N' ) then call Write_DG_Amp_Turns else
```

```
c
c   Restore old DG Currents
c do icl = 1, Number_of_DG_Vectors

T_DG_Amp_Turns ( icl ) =
     +          T_DG_Amp_Turns ( icl ) - DG_Amp_Turns ( icl )

end do end if c
c   Print the Data?
c write ( 6, * )
     +    ' Print the D/G Currents (N)?' ans = ' '
     read ( 5, 01 ) ans if ( upcase ( ans ) .eq. 'Y' )
     +    call Print_DG_Amp_Turns return 01   format ( a )

end
c
c   subroutine Reduce_Neg_DG_Coil_Constraint +-+-+-+-+-+-+-+-+-+-+-+-+--
c subroutine Reduce_Neg_DG_Coil_Constraint ( C_Ratio )

c
c   subroutine to:
c
c       Reduce Negative D/G Coil Constraint Values to Zero
c include 'pcdg_Par.fin'
     include 'pcdg_Fil.fin'
     include 'pcdg_Col.fin'
     include 'pcdg_Mea.fin' character
     +    clb * 4 call Calculate_Total_DG_Moment ( DG_Coil_Moment )

do icl = 1, Number_of_DG_Vectors if ( icl .le. Number_of_Meas_DG_Runs ) then clb = Meas_DG_Coil_Label ( icl )

else call Get_Calc_Coil_Label ( icl, clb, jcl, jgp )
```

```
            end if call Get_Mas_Coil_Correlation
   +        ( clb, jcl, jgp )

if ( DG_Coil_Moment ( jgp ) * DG_Amp_Turns ( icl ) .gt.
   +        0.0 )
   +     DG_Coil_Constraint ( jcl, jgp ) =
   +     DG_Coil_Constraint ( jcl, jgp ) * C_Ratio end do return end
c
c  subroutine Reset_DG_Coil_Constraints +-+-+-+-+-+-+-+-+-+-+-+-+-+-+-+-
c
      subroutine Reset_DG_Coil_Constraints
c
c  subroutine to:
c
c     Reset D/G Coil Contraint Values to Maximum
c
      include 'pcdg_Par.fin'
      include 'pcdg_Fil.fin'
      include 'pcdg_Col.fin'
      include 'pcdg_Mea.fin' dimension
   +     scal ( 3 ),
   +     dvec ( 3 )

character
   + clb * 4 dvec ( 1 ) = 0.0
      dvec ( 2 ) = 0.0
      dvec ( 3 ) = 0.0 write ( 6, * )
   +    ' Enter D/G Coil Constraint Scaling Vector (1.0, 1.0, 1.0):'
      read ( 5, * ) scal
      if ( scal ( 1 ) .le. 0.0 ) scal ( 1 ) = 1.0
      if ( scal ( 2 ) .le. 0.0 ) scal ( 2 ) = 1.0
      if ( scal ( 3 ) .le. 0.0 ) scal ( 3 ) = 1.0 do icl = 1, Number_of_DG_Vectors if ( icl .le. Number_of_Meas_DG_Runs ) then clb = Meas_DG_Coil_Label ( icl )

else call Get_Calc_Coil_Label ( icl, clb, jcl, jgp )

end if
```

```
      call Get_Mas_Coil_Correlation
    + ( clb, jcl, jgp )

DG_Coil_Constraint ( jcl, jgp ) =
    +    AMaster_Supply_Max_Current ( jcl, jgp )

icp = translate_component (
    +    Master_Coil_Component ( jgp ) )

if ( icp .eq. 1 )
    +    DG_Coil_Constraint ( jcl, jgp ) =
    +    DG_Coil_Constraint ( jcl, jgp ) * scal ( 1 )
      if ( icp .eq. 2 )
    +    DG_Coil_Constraint ( jcl, jgp ) =
    +    DG_Coil_Constraint ( jcl, jgp ) * scal ( 2 )
      if ( icp .eq. 3 )
    +    DG_Coil_Constraint ( jcl, jgp ) =
    +    DG_Coil_Constraint ( jcl, jgp ) * scal ( 3 )

end do return end
c
c subroutine Get_Mas_Coil_Correlation -+-+-+-+-+-+-+-+-+-+-+-+-+-+-+-+-+-
c
      subroutine Get_Mas_Coil_Correlation ( Coil_Label, jcl, jgp )
c
c
c Routine to Get Group & Coil Number for a Coil Label
c
c
c
      include 'pcdg_Par.fin'
      include 'pcdg_Fil.fin'
      include 'pcdg_Col.fin' character
    +    Coil_Label * ( * ),
    +    str1 * 255 jcl = 0
      jgp = 0
      do igp = 1, Number_of_Master_Coil_Groups do icl = 1, Number_of_Mas_Coils_per_Group ( igp )

if ( Master_Coil_Label ( icl, igp ) .eq. Coil_Label ) then jcl = icl
               jgp = igp return end if end do
```

```
          end do str1 = Coil_Label
          ns = nlblk ( str1 ) + 1
          ne = len ( str1 ) - ntblk ( str1 )

write ( 6, * )
       +    '*** ERROR in Get_Mas_Coil_Correlation Subr. ***'
          write ( 6, * ) 'Coil "', str1 ( ns : ne ), '" NOT Found.' write ( 6, * )

write ( 6, * ) ' Enter <CR> to Continue...'
          read ( 5, * )

return end
c
c  subroutine Get_Calc_Coil_Label +-+-+-+-+-+-+-+-+-+-+-+-+-+-+-+-
c
          subroutine Get_Calc_Coil_Label ( lcl, clb, jcl, jgp )
c
c
c  Routine to Get Calculated Coil Label "clb", D/G Group "jgp" &
c  Coil Number "jcl" for D/G Coil Vector "icl"
c
c
c
          include 'pcdg_Par.fin'
          include 'pcdg_Fil.fin'
          include 'pcdg_Col.fin'
          include 'pcdg_Mea.fin' character
       +    clb * ( * ),
       +    str1 * 255 jcl = 0
          jgp = 0
          clb = 'qqqq' kcl = lcl - Number_of_Meas_DG_Runs if ( kcl .lt. 1 ) go to 10 ic = 0 do igp = 1, Number_of_DG_Coil_Groups do icl = 1, Number_of_DG_Coils_per_Group ( igp )

ic = ic + 1 if ( ic .eq. kcl ) then clb = Calc_DG_Coil_Label ( icl, igp )

jcl = icl
```

```
              jgp = igp return end if end do end do 10 write ( 6, * )
   +    '* ERROR in GET_CALC_COIL_LABEL Subr. *'
      write ( 6, * ) 'Coil_Vector "', icl, '" NOT Found.' write ( 6, * )

write ( 6, * ) ' Enter <CR> to Continue...'
      read ( 5, * )

return end
c
c  subroutine Calculate_C_DG_Off_Board_Fields +-+-+-+-+-+-+-+---+-+-+-+-
c subroutine Calculate_C_DG_Off_Board_Fields c
c  subroutine to:
c
c               calculate the off-board fields [Rd]
c include 'pcdg_Par.fin'
      include 'pcdg_Fil.fin'
      include 'pcdg_Sen.fin'
      include 'pcdg_Col.fin' c
c   Check Appropriate Flags & Update Necessary Data
c c
c   calculate the Off-Board Field Vector [Rd]
c
      write ( lulog, * ) ' Calculating the Off-Board Fields [Rd]' do isn = 1, Number_of_Off_Board_Sensors

C_DG_Off_Board_Fields ( isn ) =
   +        A_UNDG_Off_Board_Fields ( isn )

do igp = 1, Number_of_DG_Vectors

C_DG_Off_Board_Fields ( isn ) =
   +           dble ( C_DG_Off_Board_Fields ( isn ) ) -
   +           dble ( ALSQ_Factors ( igp ) ) *
   +           dble ( Off_Board_DG_Coil_Matrix ( isn, igp ) )

end do
```

```
          end do call Write_C_DG_Off_Board_Fields
          call Read_C_DG_Off_Board_Fields ( ier )

C_DG_Off_B_Fields_Data_Flag = New c         call Update_Flags ( C_DG_Off_Board_Fields_Step )

return end
c
c   subroutine Write/Display/Print_DG_Amp_Turns -+-+-+-+-+-+-+-+-+-+-+-+-
c
          subroutine Write_DG_Amp_Turns c
c         Display the D/G currents & Power Supply Data
c
c include 'pcdg_Par.fin'
          include 'pcdg_Fil.fin'
          include 'pcdg_Sen.fin'
          include 'pcdg_Mea.fin'
          include 'pcdg_Col.fin' dimension
         +    jsort (
         +      max_Number_of_DG_Vectors )

character
         +    clb * 4,
         +    chr1 * 2,
         +    disp * 12 logical
         +    Footnote_Test,
         +    Sort_flag
c
c   D/G Setup OK?
c
          if ( Number_of_DG_Vectors .le. 0 ) then write ( 6, * ) ' ERROR   The Number of D/G Coils is: ',
         +   Number_of_DG_Vectors end if c
c   initialize parameters
c
          Write_Display_Mode = M_Write c
c   open file "DG_Amp_Turns_File" on luint
c
```

```
          oldfil = DG_Amp_Turns_File
          disp = 'keep'
          go to 20

ENTRY Print_DG_Amp_Turns

Write_Display_Mode = M_Print
          oldfil = 'junk.prn'
          disp = 'print/delete' c
c    open file "DG_Coil_Conf_File" on luint
c 20        continue
          W_D_lu = luint
          ns = nlblk ( oldfil ) + 1
          ne = len ( oldfil ) - ntblk ( oldfil )
          close ( unit = W_D_lu )
          if ( Write_Display_Mode .eq. M_Write )
     +       write ( lulog, * ) ' Opening new File ', oldfil ( ns : ne ),
     +    ' on LU ',W_D_lu
          if ( Write_Display_Mode .eq. M_Print )
     +       write ( lulog, * ) ' Printing D/G Currents.'
          open ( unit = W_D_lu, file = oldfil ( ns : ne ),
     +       status = 'new' )
          go to 10

ENTRY Display_DG_Amp_Turns c
c    initialize parameters
c
          Write_Display_Mode = M_Display
          W_D_lu = luforout 10        continue c
c    Display the D/G Amp Turn Array
c Sort_flag = .false.

if ( Write_Display_Mode .eq. M_Display .or.
     +         Write_Display_Mode .eq. M_Print ) then write ( 6, * ) ' Sort for Power Supply (N)?'
             read ( 5, 01 ) ans if ( upcase ( ans ) .eq. 'Y' ) then Sort_flag = .true.
                call sort_currents ( jsort )

end if end if

Footnote_Test = .false.

write ( W_D_lu, 02 ) test, ship
```

```
      write ( W_D_lu, 03 )
      write ( W_D_lu, 05 )

do kcl = 1, Number_of_DG_Vectors icl = kcl
         if ( Sort_flag ) icl = jsort ( kcl )

if ( icl .le. Number_of_Meas_DG_Runs ) then clb = Meas_DG_Coil_Label ( icl )

else call Get_Calc_Coil_Label (
     +           icl, clb, jcl, jgp )

end if call Get_Mas_Coil_Correlation
     +      ( clb, jcl, jgp )

c
c    get turn data
c
         call Get_Recommended_Current
     +      (
     +      DG_Amp_Turns ( icl ),    !D/G Coil Amp_Turns
     +      jcl,                     !Master Coil Number
     +      jgp,                     !Master Coil Group Number
     +      nat,                     !Total Active Turns
     +      nrt,                     !Total Recommended Turns
     +      cr,                      !Total Recommended Current
     +      chrl                     !Under/Over-Current Flag
     +      )

if ( chrl .ne. ' ' ) Footnote_Test = .true.

t1 =
     +      -DG_Amp_Turns ( icl )
         t2 =
     +      -DG_Amp_Turns ( icl ) / nat
         t3 =
     +      -cr if ( abs ( t2 ) .lt. 1.0e+04 .or.
     +        abs ( t3 ) .lt. 1.0e+04 )
     +      write ( W_D_lu, 04 )
     +         'Coil',
     +         icl,
     +         clb,
     +         AMaster_Supply_Label ( jcl, jgp ),
     +         t1,
     +         nat,
     +         t2,
     +         nrt,
     +         t3,
     +         chrl if ( abs ( t2 ) .ge. 1.0e+04 .or.
     +        abs ( t3 ) .ge. 1.0e+04 )
```

```
     +          write ( W_D_lu, C6 )
     +          'Coil',
     +          icl,
     +          clb,
     +          AMaster_Supply_Label ( jcl, jgp ),
     +          t1,
     +          nat,
     +          t2,
     +          nrt,
     +          t3,
     +          chr1 end do write ( W_D_lu, O5 )

if ( Footnote_Test ) then write ( W_D_lu, * )
     +    '    ** - Exceeds Power Supply Maximum'
           write ( W_D_lu, * )
     +    '     * - Below Power Supply Minimum' end if c
c    Get UND/G Peaks
c up =
     +  Array_Max (
     +         A_UNDG_Off_Board_Fields,
     +         Number_of_Off_Board_Sensors, I_Max
     +         )
        un =
     +  Array_Min (
     +         A_UNDG_Off_Board_Fields,
     +         Number_of_Off_Board_Sensors, I_Min
     +         )

c
c    Get D/G Peaks
c dp =
     +  Array_Max (
     +         C_DG_Off_Board_Fields,
     +         Number_of_Off_Board_Sensors, I_Max
     +         )
        dn =
     +  Array_Min (
     +         C_DG_Off_Board_Fields,
     +         Number_of_Off_Board_Sensors, I_Min
     +         )

c
c    Get Max Current & D/G Coil
c call Get_Max_DG_Current ( clb, DG_Amp_Turns, curr )

c
```

```
c   Display Results
c
        write ( W_D_lu, * ) ' Undegaussed Peaks:'
        write ( W_D_lu, * ) up, un, up - un, '(Pk to Pk)'
        write ( W_D_lu, * ) '   Degaussed Peaks:'
        write ( W_D_lu, * ) dp, dn, dp - dn, '(Pk to Pk)'
        write ( W_D_lu, * ) ' D/G Coil & Maximum Current:'
        write ( W_D_lu, * ) clb, ' -- ', curr if ( Write_Display_Mode .eq. M_Write .or.
     +       Write_Display_Mode .eq. M_Print ) then close ( unit = W_D_lu, status = disp )

else write ( W_D_lu, * ) ' Enter <CR> to Continue...'
           read ( 5, * )

end if return 01      format ( a )
02      format ( t23, '-----D/G CURRENT DATA-----'/
     +           t26, 'Test: ', a, ' - Ship: ', a/
     +  )
03      format
     +  (
     +  t05, 'D/G Coil',
     +  t18, '|',
     +  t20, 'Supply',
     +  t27, '|',
     +  t31, 'Amp-Turns',
     +  t42, '|',
     +  t46, 'Present',
     +  t59, '|',
     +  t61, 'Recommended'/

+  t18, '|',
     +  t27, '|',
     +  t42, '|',
     +  t44, 'Turns    Amps',
     +  t59, '|',
     +  t61, 'Turns    Amps',
     +  t75, '|'
     +  )

04      format
     +  (
     +  t2, a,             !'Coil',
     +  t7, i3,            !icl,
     +  t13, a,            !clb,
     +  t18, '|',
     +  t21, a,            !AMaster_Supply_Label ( jcl, jgp ),
     +  t27, '|',
     +  t28, f13.3,        !DG_Amp_Turns ( icl ),
     +  t42, '|',
     +  t44, i3,           !nat,
     +  t48, f9.3, !DG_Amp_Turns ( icl ) / nat,
     +  t59, '|',
```

```
      + t61, i3,          !nrt,
      + t65, f9.3, !cr,
      + t75, '|',
      + t77, a            !chr1
      + )

05      format
      + (
      + t02, '----------------',
      + t18, '|--------',
      + t27, '|--------------',
      + t42, '|----------------',
      + t59, '|---------------',
      + t75, '|'
      + )

06      format
      + (
      + t2,  a,           !'Coil',
      + t7,  i3,          !icl,
      + t13, a,           !clb,
      + t18, '|',
      + t21, a,           !AMaster_Supply_Label ( jcl, jgp ),
      + t27, '|',
      + t28, f13.3,       !DG_Amp_Turns ( icl ),
      + t42, '|',
      + t44, i3,          !nat,
      + t48, 1pg9.2,      !DG_Amp_Turns ( icl ) / nat,
      + t59, '|',
      + t61, i3,          !nrt,
      + t65, 1pg9.2,      !cr,
      + t75, '|',
      + t77, a            !chr1
      + )

end
```

1. A system for controlling off-board magnetic fields of a three dimensional object comprising: a plurality of degaussing coils independently controllable in response to dedicated current control signals; controller means for processing data on geographic position and heading of said object in accordance with a least squares minimization routine to determine said dedicated current control signals; and means distributing said dedicated current control signals amongst said plurality of degaussing coils causing reduction in the off-board magnetic fields to zero at one specific location of the object and minimized at all other locations thereof.

2. A system as in claim 1 wherein said plurality of degaussing coils includes longitudinal, athwartship and vertical degaussing coils.

3. A system as in claim 1 further comprising a plurality of power supplies, each of said plurality of power supplies receiving one of said dedicated control signals and supplying current to a corresponding one of said plurality of degaussing coils.

4. A system as in claim 1 wherein said distributing means is a multiplexer.

5. A method of controlling off-board magnetic fields by a plurality of independently controllable degaussing coils on a three dimensional object, comprising the steps of: providing geographical position and heading of said three dimensional object; establishing a specific location of interest for said three dimensional object;

determining coil current for each of said plurality of degaussing coils using the geographic position and heading; and applying said coil current to each of said plurality of degaussing coils causing reduction of said off-board magnetic field to zero at said specific location and minimization thereof at all other locations of the three dimensional object.

6. A method according to claim 5 wherein said step of determining is accomplished in accordance with a least squares minimization routine processed on a digital computer.

7. The method as defined in claim 5 wherein said object is a marine vessel and said step of establishing the specific location is effected by an underwater magnetic detector.

8. In a system for controlling off-board magnetic fields of a marine vessel by a plurality of degaussing coils in response to current control signals, controller means for processing input data to determine said current control signals in accordance with a least squares minimization routine, data collecting means connected to said controller means for supply of the input data thereto relating to geographic position and heading of the vessel and one specific location thereof, underwater magnetic detector means for establishing said one specific location for the vessel, and means operatively connecting the controller means to the degaussing coils for distributing the current control signals thereto from the controller means.

9. In the system as defined by claim 8, said means for distributing the current control signals comprising: a plurality of separate power supplies respectively producing coil currents in response to the current control signals received from the controller and multiplexer means connected to the controller means for respectively transmitting the current control signals to the separate power supplies from which the coil currents are respectively fed to the degaussing coils.

* * * * *